US010632946B2

United States Patent
Jadhav et al.

(10) Patent No.: US 10,632,946 B2
(45) Date of Patent: Apr. 28, 2020

(54) BUMPER BEAM

(71) Applicants: Amar Rajendra Jadhav, Rochester Hills, MI (US); Joseph Matthew Yaldo, Bloomfield Hills, MI (US); Shrikanth Gujjal, Rochester Hills, MI (US); John J. Caito, Oakland, MI (US); Jeffrey Mellis, Bloomfield Hills, MI (US)

(72) Inventors: Amar Rajendra Jadhav, Rochester Hills, MI (US); Joseph Matthew Yaldo, Bloomfield Hills, MI (US); Shrikanth Gujjal, Rochester Hills, MI (US); John J. Caito, Oakland, MI (US); Jeffrey Mellis, Bloomfield Hills, MI (US)

(73) Assignee: MAGNA INTERNATIONAL INC., Aurora (CA)

(*) Notice: Subject to any disclaimer, the term of this patent is extended or adjusted under 35 U.S.C. 154(b) by 0 days.

(21) Appl. No.: 15/743,017

(22) PCT Filed: Jul. 21, 2016

(86) PCT No.: PCT/US2016/043373
§ 371 (c)(1),
(2) Date: Jan. 9, 2018

(87) PCT Pub. No.: WO2017/015482
PCT Pub. Date: Jan. 26, 2017

(65) Prior Publication Data
US 2018/0222416 A1 Aug. 9, 2018

Related U.S. Application Data
(60) Provisional application No. 62/194,960, filed on Jul. 21, 2015.

(51) Int. Cl.
*B60R 19/02* (2006.01)
*B60R 19/18* (2006.01)

(52) U.S. Cl.
CPC ........ *B60R 19/18* (2013.01); *B60R 2019/182* (2013.01); *B60R 2019/1806* (2013.01)

(58) Field of Classification Search
CPC . B60R 19/34; B60R 19/18; B60R 2019/1853; B60R 2019/182;
(Continued)

(56) References Cited

U.S. PATENT DOCUMENTS 4,466,653 A * 8/1984 Harasaki ................ B62D 25/08
280/784
4,671,550 A 6/1987 Molnar
(Continued)

FOREIGN PATENT DOCUMENTS

| CH | 689638 A5 | 7/1999 |
|----|-----------|--------|
| EP | 1410954 A1 | 4/2004 |
| WO | 2015048891 A1 | 4/2015 |

OTHER PUBLICATIONS

International Search Report; EP 16 82 8550; dated Nov. 21, 2018; 8 pages.

*Primary Examiner* — Kiran B Patel
(74) *Attorney, Agent, or Firm* — Dickinson Wright PLLC

(57) ABSTRACT

A bumper beam includes an outer portion and an inner portion each extending between a top end and a bottom end. At least one of the outer portion or the inner portion includes a pair of geometrical features each of which are disposed in spaced relationship to one another and adjacent a respective one of the top or bottom ends. A top wall and a bottom wall each extend from one of the geometrical features to the other of the outer portion or the inner portion to interconnect the outer and inner portions of the bumper beam. The geometrical features can be varied in size and shape to change and
(Continued)

tune the energy absorption properties of the bumper beam and ultimately provide for a bumper beam that is adaptable and flexible over a range of vehicle applications.

9 Claims, 8 Drawing Sheets

(58) Field of Classification Search
CPC .......... B60R 2019/1866; B62D 21/152; A45C 11/00; A45C 2011/002; B29C 66/71
See application file for complete search history.

(56) References Cited

U.S. PATENT DOCUMENTS

| | | | |
|---|---|---|---|
| 4,951,986 A * | 8/1990 | Hanafusa | B29C 49/4802 264/523 |
| 6,000,738 A * | 12/1999 | Stewart | B60R 19/18 293/102 |
| 6,360,441 B1 * | 3/2002 | Himsl | B60R 19/18 29/897.2 |
| 6,428,065 B2 * | 8/2002 | Sato | B60R 19/12 293/102 |
| 6,435,577 B1 * | 8/2002 | Renault | B60R 19/12 293/120 |
| 6,502,874 B2 * | 1/2003 | Kajiwara | B60R 19/18 293/120 |
| 6,709,044 B2 | 3/2004 | Frank | |
| 6,746,061 B1 | 6/2004 | Evans | |
| 6,908,130 B2 * | 6/2005 | Reutlinger | B60R 19/18 293/102 |
| 6,948,749 B2 * | 9/2005 | Graber | B21D 5/086 293/102 |
| 7,017,960 B2 * | 3/2006 | Reierson | B60R 19/18 293/102 |
| 7,131,674 B2 | 11/2006 | Evans et al. | |
| 7,370,893 B2 * | 5/2008 | Tamada | B60R 19/18 293/120 |
| 7,503,601 B2 * | 3/2009 | Agrahari | B60R 19/18 29/897.2 |
| 7,537,252 B2 * | 5/2009 | Nagai | B60R 19/18 293/102 |
| 7,837,244 B2 * | 11/2010 | Hashimura | B60R 19/18 293/102 |
| 7,857,610 B2 * | 12/2010 | Rossi | B29C 43/42 425/324.1 |
| 8,016,331 B2 * | 9/2011 | Ralston | B60R 19/18 293/120 |
| 8,562,041 B2 * | 10/2013 | Kinefuchi | B60R 19/03 292/120 |
| 9,004,216 B1 * | 4/2015 | Baccouche | B60R 21/36 180/274 |
| 9,061,713 B2 * | 6/2015 | Hashimoto | B62D 21/152 |
| 9,381,880 B2 * | 7/2016 | Matecki | B60R 19/023 |
| 9,522,644 B2 * | 12/2016 | Prasoody | B60R 19/18 |
| 9,751,478 B2 * | 9/2017 | Terada | B60R 19/18 |
| 2003/0227182 A1 * | 12/2003 | Yoshida | B60R 19/18 293/102 |
| 2004/0174025 A1 * | 9/2004 | Converse | B60R 19/18 293/133 |
| 2004/0178645 A1 * | 9/2004 | Minami | B60R 19/18 293/121 |
| 2006/0131899 A1 * | 6/2006 | Adachi | B60R 19/18 293/109 |
| 2006/0138790 A1 * | 6/2006 | Okabe | B60R 19/18 293/102 |
| 2007/0228747 A1 * | 10/2007 | Hodoya | B60R 19/18 293/102 |
| 2008/0048462 A1 * | 2/2008 | Zabik | B60R 19/18 293/120 |
| 2009/0140546 A1 * | 6/2009 | Okabe | B60R 19/18 296/187.09 |
| 2010/0109354 A1 * | 5/2010 | Agrahari | B60R 19/18 293/120 |
| 2013/0119680 A1 * | 5/2013 | Kosaka | B60R 19/18 293/102 |
| 2015/0102613 A1 * | 4/2015 | Johnson | B60R 19/18 293/102 |
| 2015/0137494 A1 * | 5/2015 | Le | B60R 19/16 280/735 |
| 2017/0106429 A1 * | 4/2017 | Nakanishi | B60R 19/18 |
| 2017/0106822 A1 * | 4/2017 | Steinebach | B60R 19/03 |
| 2017/0136970 A1 * | 5/2017 | Steinebach | B60R 19/18 |
| 2017/0274851 A1 * | 9/2017 | Schneider | B60R 19/18 |
| 2018/0037179 A1 * | 2/2018 | Steinebach | B22D 25/02 |

* cited by examiner

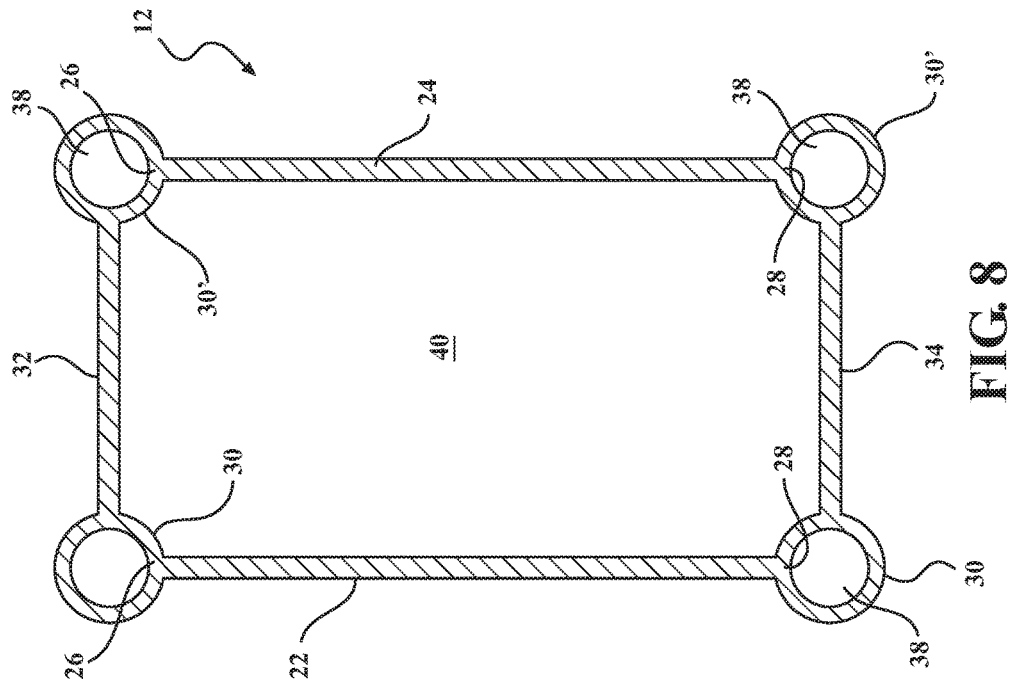
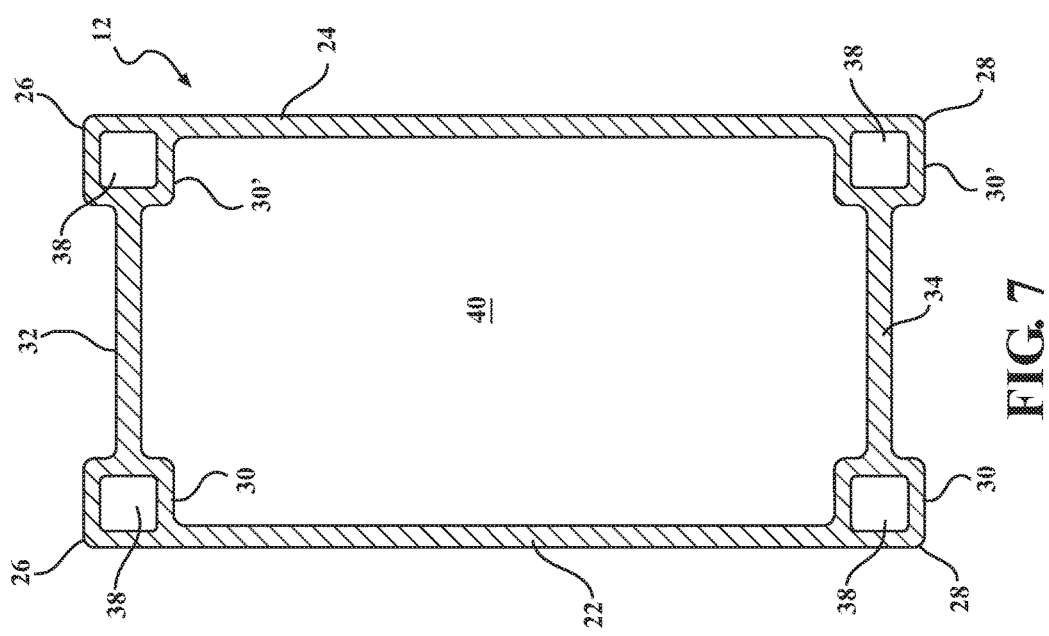

BUMPER BEAM

CROSS REFERENCE TO RELATED APPLICATIONS

This U.S. National Stage Patent Application claims the benefit of PCT Patent International Application Serial No. PCT/US2016/043373 filed Jul. 21, 2016 entitled "Bumper Beam" which claims the benefit of U.S. Provisional Patent Application Ser. No. 62/194,960 filed on Jul. 21, 2015 entitled "Bumper Beam," the entire disclosures of the applications being considered part of the disclosure of this application and hereby incorporated by reference.

STATEMENT REGARDING FEDERALLY SPONSORED RESEARCH

NONE.

TECHNICAL FIELD

This invention relates generally to a vehicle bumper assembly and more particularly to a bumper beam for a vehicle.

BACKGROUND OF THE INVENTION

Vehicle bumper assemblies are known for providing energy absorbing characteristics. A typical vehicle bumper assembly comprises a bumper beam and a pair of crush cans. The crush cans are positioned on the end of a frame member of a vehicle body structure and also secured to the bumper beam so as to absorb impact loads of certain predetermined values, thereby reducing or eliminating deformation of the frame member of the vehicle body.

Bumper assemblies generally comprise a bumper beam typically extending laterally across the front or rear of a vehicle and which are provided generally for absorbing energy during a front or rear impact. Such bumper beams are disposed under a cosmetic overlay or fascia and are either mounted directly to vehicle frame members or to a vehicle frame member by the crush cans as discussed above. The crush cans are designed to fold upon such front or rear impacts.

There are several issues with current bumper beam designs and methods of manufacture. Generally speaking, each vehicle model or market segment may require a separately and uniquely designed bumper beam to meet the desired performance characteristics and the necessary governmental regulations, with heavier and larger vehicles typically requiring more robust designs than lighter vehicles. In addition, current bumper beam designs are generally quite complex and incorporate a plurality of cross-ribs and other support structures in the bumper beam to meet the necessary performance and regulatory requirements. Such designs require complex tooling to manufacture the bumper beam which can add to tooling costs associated with changing the bumper beam designs to match and accommodate changes in the vehicle market segment designs. In addition, current bumper beams tend to weigh more than is desirable especially when attempting to maximize fuel efficiency while maintaining the desired performance characteristics.

Thus, there remains a significant and continuing need for a design of a bumper beam that could be rapidly and cost effectively designed and modified for use across a wide range of vehicle segments and that would allow for lower manufacturing and assembling costs along with improved energy absorption characteristics in a lighter weight assembly.

SUMMARY OF THE INVENTION

A bumper beam in accordance with the subject disclosure includes an outer portion and an inner portion each extending between a top end and a bottom end. At least one of the outer portion or the inner portion includes a pair of geometrical features each of which are disposed in spaced relationship to one another and adjacent a respective top or bottom end of the bumper beam. A top wall and a bottom wall each extend from one of the geometrical features to the other of the outer portion or the inner portion to interconnect the outer and inner portions of the bumper beam.

The geometrical features of the bumper beam can be varied in size and shape to change and tune the energy absorption properties of the bumper beam and ultimately provide for a bumper beam that is more adaptable and flexible over a range of different vehicle segments when compared to prior art bumper beams. In addition, the geometrical features provide for a bumper beam that includes a unique cross-sectional or design geometry that permits for a lighter weight bumper beam as compared to previous designs and distributes energy from an impact to prevent cracking of the bumper beam.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 7 is a cross-sectional view of the bumper beam illustrating a square cross-sectional shape of the first and second pair of geometrical features;

FIG. 8 is a cross-sectional view of the bumper beam illustrating a circular cross-sectional shape of the first and second pair of geometrical features;

DETAILED DESCRIPTION OF THE PREFERRED EMBODIMENTS

As discussed herein, it is desirable to create a bumper beam having a lighter weight that can be rapidly tuned during design to accommodate a variety of vehicle segments in a cost efficient manner. The current vehicle bumper beam designs often include an outer wall and an inner wall joined by a top wall and a bottom wall and other complex structures or connecting features. Such structures are difficult to modify and to design the tooling for manufacturing the bumper beam. The present disclosure is directed to a more universal bumper beam design that can be easily modified to fit across a variety of vehicle segments.

Figure 1:
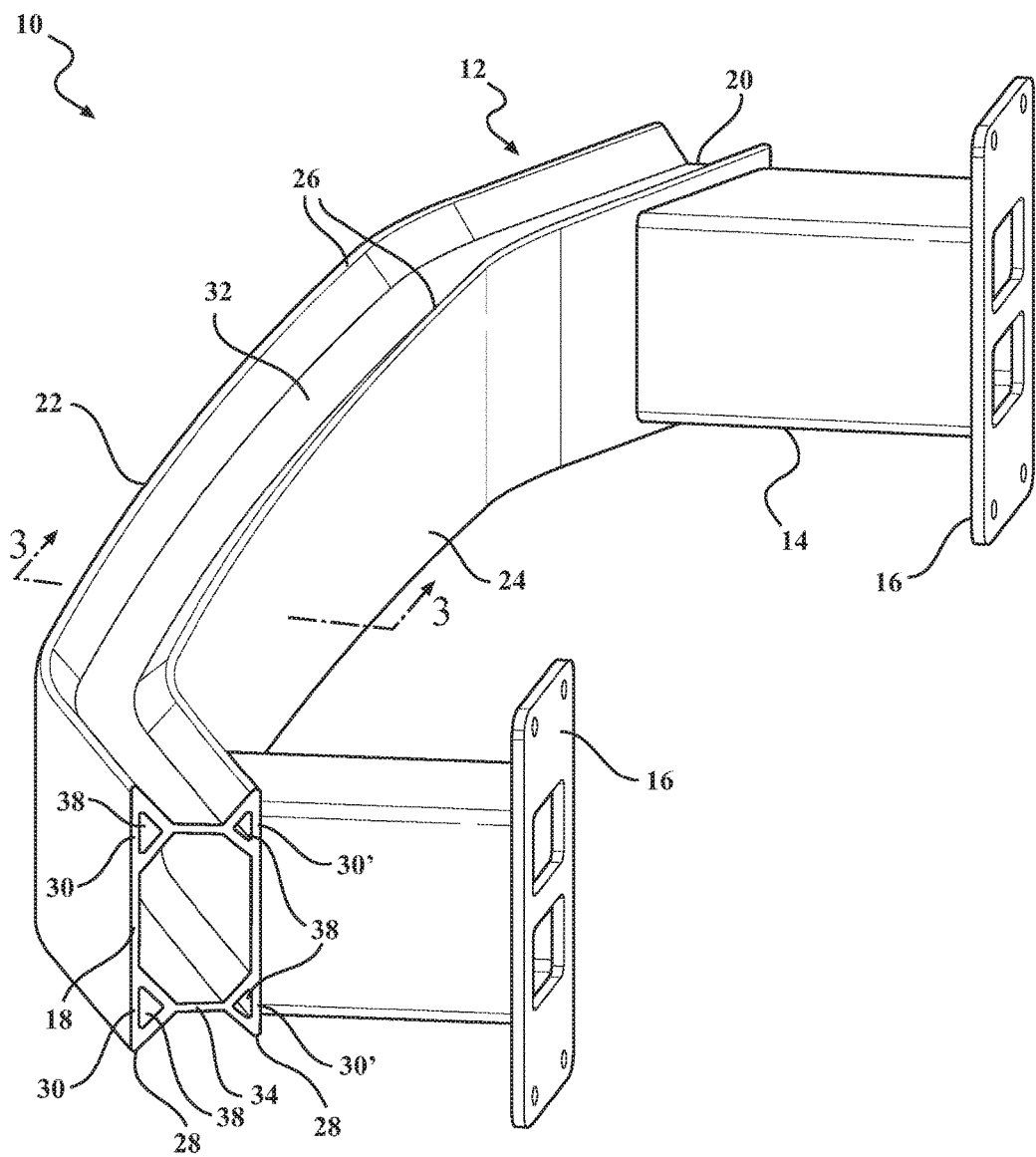
FIG. 1 is a perspective view of a bumper assembly including a bumper beam attached to a pair of crush cans.
Figure 2:
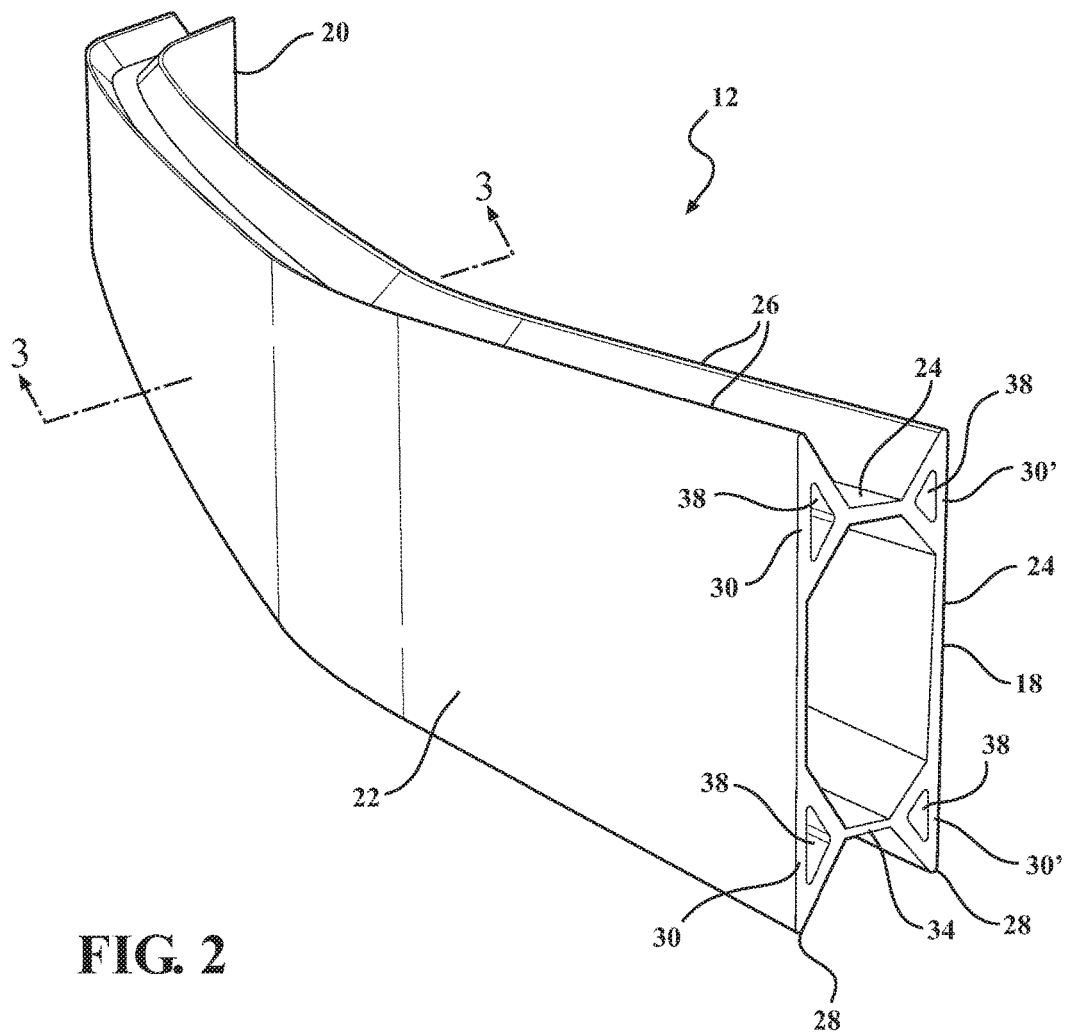
FIG. 2 is a perspective view of an alternative arrangement of the bumper assembly illustrating the bumper beam without a pair of crush cans.
Figure 3:
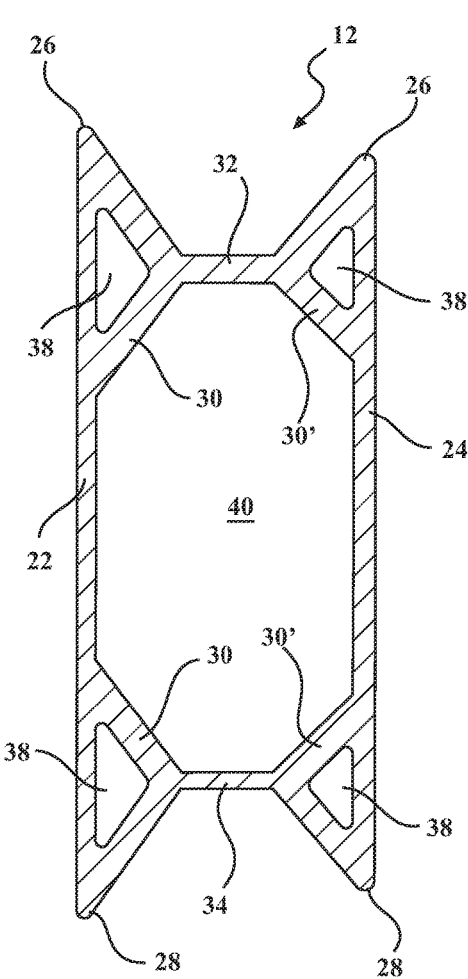
FIG. 3 is a cross-sectional view of the bumper beam of FIGS. 1 and 2 taken along 3-3 and illustrating a first pair of geometrical features integral with an outer portion of the bumper beam and disposed adjacent a respective top or bottom end of the bumper beam and a second pair of geometrical features integral with an inner portion of the bumper beam and each disposed adjacent a respective top or bottom end of the bumper beam.
Figure 11:
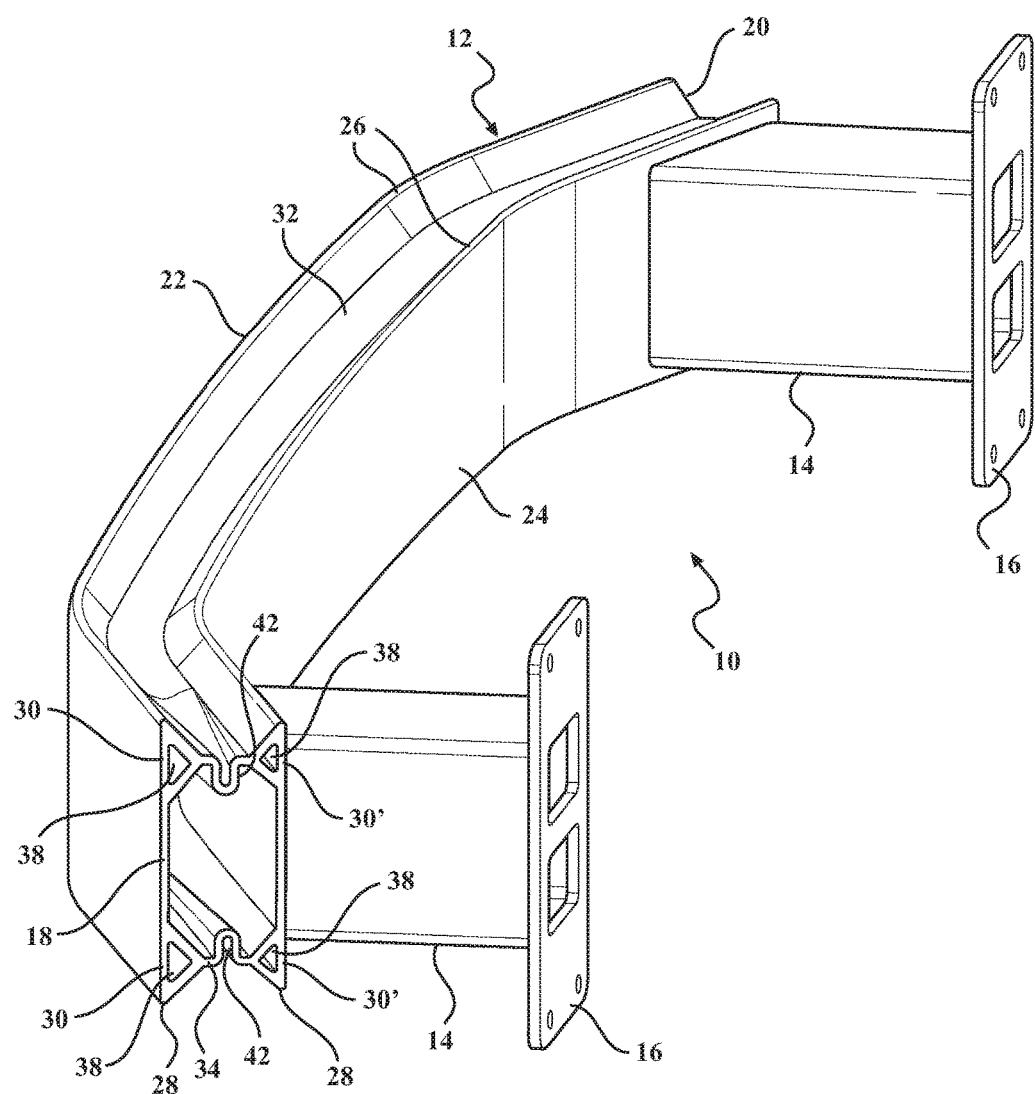
FIG. 11 is a perspective view of an alternative arrangement of the bumper assembly illustrating a bumper beam having a non-constant cross-sectional shape along its length and attached to a pair of crush cans.
Figure 12:
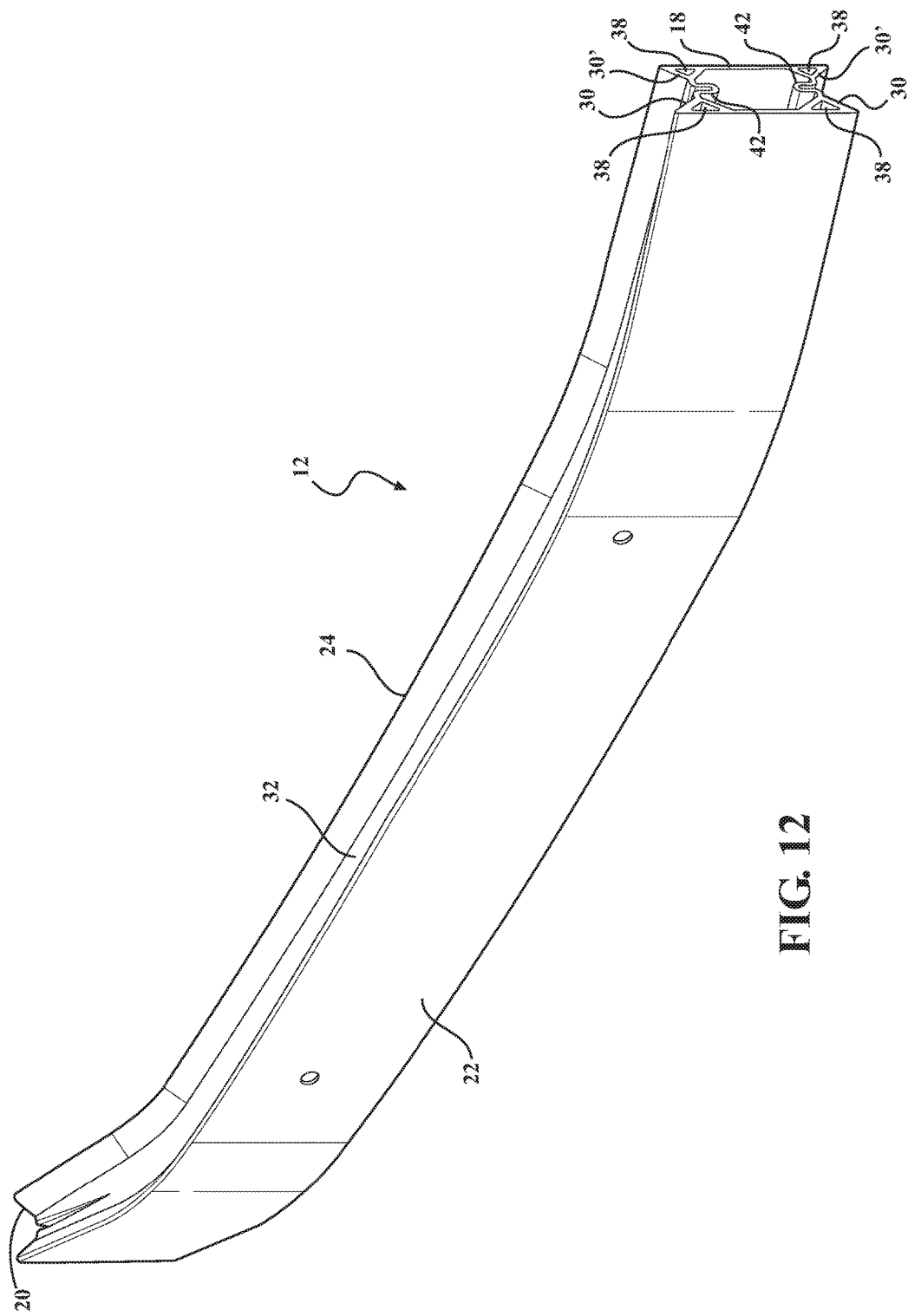
FIG. 12 is a perspective view of an alternative arrangement of the bumper assembly illustrating the bumper beam of FIG. 11 without attachment to a pair of crush cans.

As best illustrated in FIGS. 1 and 11, a bumper assembly 10 can include a bumper beam 12 as well as a pair of crush cans 14 that can be used to secure the bumper assembly 10 to a frame member of a vehicle. However, as best illustrated in FIGS. 2 and 12, the bumper assembly 10 can also include only the bumper beam 12 which is then secured directly to the vehicle frame member without the use of crush cans 14. In either arrangement, the bumper beam 12 provides shape and structural strength to the bumper assembly 10 and is ultimately covered by a cosmetic over-covering or fascia designed in accordance with the desired aesthetics of the vehicle. With reference to FIGS. 1 and 11, when the bumper assembly 10 includes both the bumper beam 12 and the pair of crush cans 14, the bumper beam 12 is secured to the pair of crush cans 14 using welding, adhesives, fasteners, or the like. The pair of crush cans 14 can also include plates 16 for effectuating the securement of the crush cans 14 to the vehicle frame member. In either arrangement, the bumper beam 12 extends from a first end 18 to a second end 20 and can have many different profiles along its length, including a slightly curved profile as shown in FIGS. 1, 2, 11, and 12. Alternatively, the bumper beam 12 can have a flat profile, a more pronounced curved profile, as well as a profile with sharply curved first and second ends 18, 20 that are each disposed generally perpendicular to a main body of the bumper beam 12.

As best illustrated in the Figures, the bumper beam 12 has an outer portion 22 and an inner portion 24 each of which extend between a top end 26 and a bottom end 28 of the bumper beam 12. As described above, the outer portion 22 of the bumper beam 12 will extend laterally across the front or rear of the vehicle and thus receives the initial force during a front or rear impact of the vehicle. In a preferred arrangement of the bumper beam 12, the outer portion 22 is comprised of an outer wall which extends continuously between the top and bottom ends 26, 28 and the inner portion 24 is comprised of an inner wall which extends continuously between the top and bottom ends 26, 28. However, one or both of the outer and inner portions 22, 24 could be open, i.e., not include a wall which extends continuously between the top and bottom ends 26, 28, without departing from the scope of the subject disclosure. When the outer and inner portions 22, 24 are comprised of walls, the outer and inner wall are preferably arranged in generally parallel relationship to each other.

Figure 5:
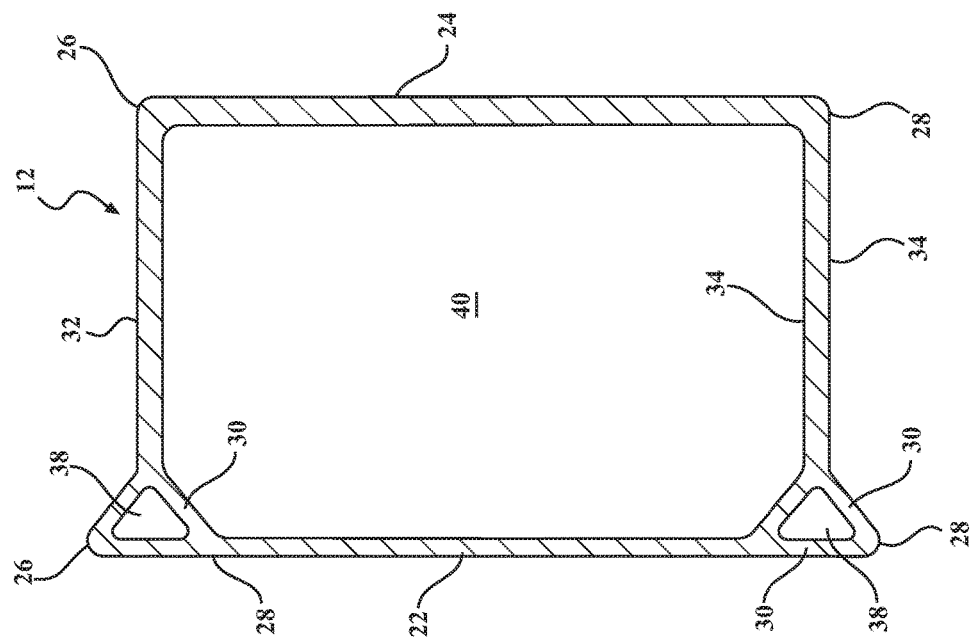
FIG. 5 is a cross-sectional view of an alternative arrangement of the bumper beam illustrating the pair of geometrical features disposed only on the outer portion of the bumper beam.

At least one of the outer or inner portions 22, 24 of the bumper beam 12 includes a pair of geometrical features 30 disposed in spaced relationship to one another, with each of the geometrical features 30 disposed at or adjacent a respective top or bottom end 26, 28 of the bumper beam 12 for absorbing energy during a front or rear impact of the vehicle to which the bumper beam 12 is secured. The pair of geometrical features 30 are integral with the outer or inner portion 22, 24 of the bumper beam 12 and extend continuously along the outer or inner portion 22, 24 between the first and second ends 18, 20 of the bumper beam 12. For example, and as best illustrated in FIG. 5, in one arrangement of the bumper beam 12, the pair of geometrical features 30 are integrally formed with and included on the outer portion 22 of the bumper beam 12. However, the pair of geometrical features 30 could also be integrally formed with and included on the inner portion 24 of the bumper beam 12 without departing from the scope of the subject disclosure.

The outer portion 22 and the inner portion 24 are secured to one other by a top wall 32 located near the top end 26 of the bumper beam 12 and a bottom wall 34 located near the bottom end 28 of the bumper beam 12. The top and bottom walls 32, 34 each extend from a respective one of the geometrical features 30 disposed on either the outer or inner portions 22, 24 to the other of the outer or inner portions 22, 24 (which does not include the geometrical features) to interconnect the outer and inner portions 22, 24 of the bumper beam 12. For example, and with reference to FIG. 5, when the pair of geometrical features 30 are disposed on the outer portion 22 of the bumper beam 12 and the inner portion 24 is comprised of an inner wall, the top and bottom walls 32, 34 each extend from one of the geometrical features 30 to the inner wall to interconnect the outer and inner portions 22, 24 of the bumper beam.

Figure 4:
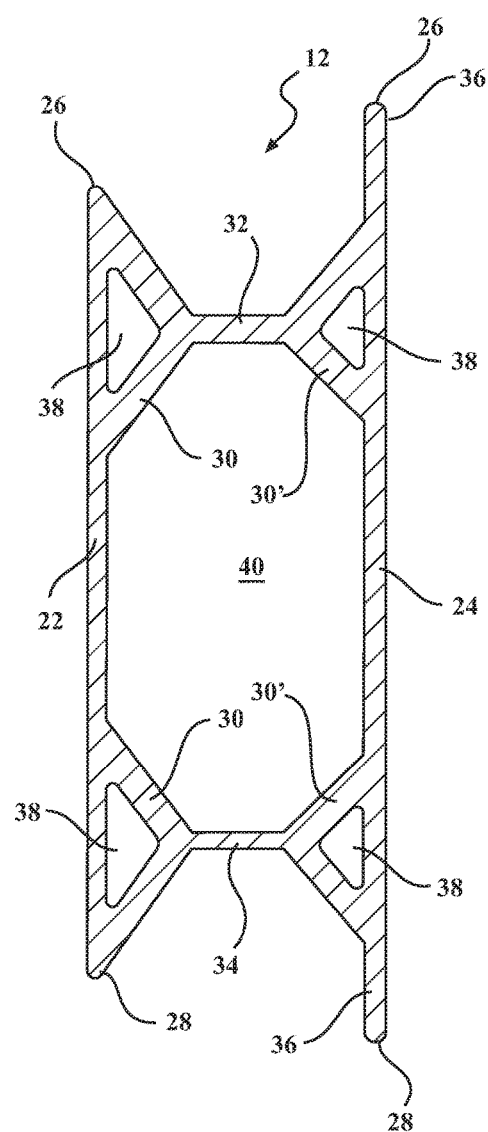
FIG. 4 is a cross-sectional view of an alternative arrangement of the bumper beam illustrating a pair of flanges disposed on the inner portion of the bumper beam and each extending outwardly from the pair of geometrical features.
Figure 6:
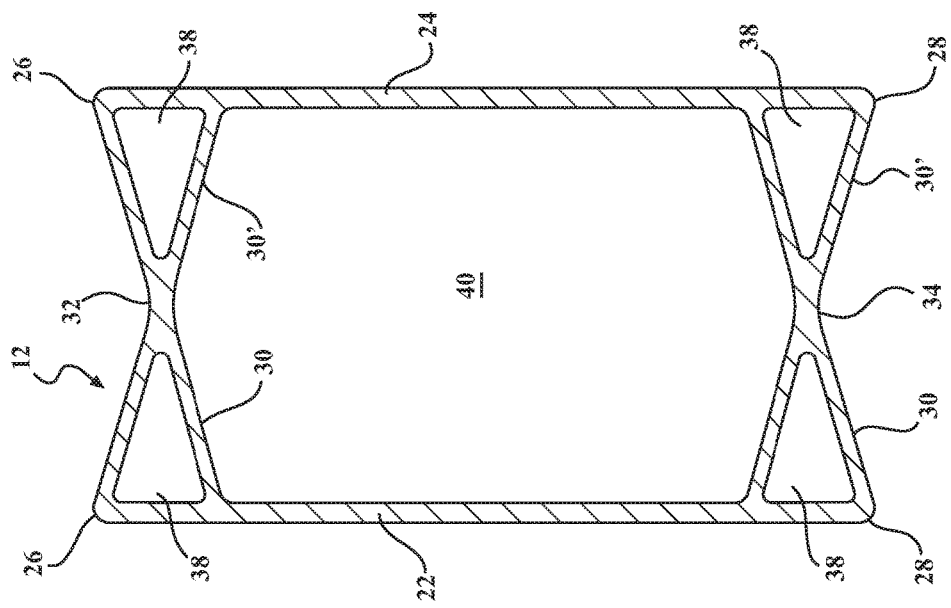
FIG. 6 is a cross-sectional view of the bumper beam illustrating a triangular cross-sectional shape of the first and second pair of geometrical features.

As best illustrated in FIGS. 3-4 and 6-10, the bumper beam can also include two pairs of geometrical features 30, 30', with a first pair of geometrical features 30 being integral with the outer portion 22 and a second pair of geometrical features 30' being integral with the inner portion 24. The first pair of geometrical features 30 are disposed in spaced relationship to one another and are each adjacent a respective top or bottom end 26, 28 of the bumper beam 12. Similarly, the second pair of geometrical features 30' are disposed in spaced relationship to one another and are each adjacent a respective top or bottom end 26, 28 of the bumper beam 12. In a preferred arrangement, the first and second pair of geometrical features 30, 30' are disposed in opposing and aligned relationship to one another and each extend continuously along the outer or inner portion 22, 24 between the first and second ends 18, 20 of the bumper beam 12. Once again, the outer portion 22 and the inner portion 24 are secured to each other by a top wall 32 located near a top end 26 of the bumper beam 12 and a bottom wall 34 located near a bottom end 28 of the bumper beam. However, when each of the outer and inner portions 22, 24 include a pair of geometrical features 30, 30', the top and bottom walls 32, 34 extend between the first and second pair of geometrical features 30, 30' to establish the interconnected relationship between the outer and inner portions 22, 24 of the bumper beam 12. In other words, the first and second pairs of geometrical features 30, 30', which are disposed opposite one another on the outer and inner portions 22, 24, are directly secured to each other to interconnect the outer and inner portions 22, 24 of the bumper beam. As best illustrated in FIG. 4, when the inner portion 24 includes a second pair of geometrical features 30', the inner portion 24 can additionally include a pair of flanges 36, each of which extend beyond the second pair of geometrical features 30' for use in securing the bumper beam 12 either to the pair of crush cans 14 or the vehicle frame.

In either arrangement of the bumper beam 12, the geometrical features 30, 30' each define a geometrical hollow 38 that extends between the first and second ends 18, 20 and is preferably filled with air from an environment of the bumper beam 12. However, the geometrical hollows 38 could also be filled with a solid material without departing from the scope of the subject disclosure. The geometrical features 30, 30' are designed to absorb energy during an impact and when disposed on the outer portion 22 reduce the transmission of energy to the inner portion 24 and the crush cans 14 (if present). Indeed, in a high force impact situation of the bumper beam 12, the geometric features 30, 30' are present to increase the amount of energy that is absorbed and distributed across the bumper beam 12 to prevent the bumper beam 12 from buckling and cracking. Thus, the geometric features improve the performance and energy absorption characteristics of the bumper beam 12.

Figure 9:
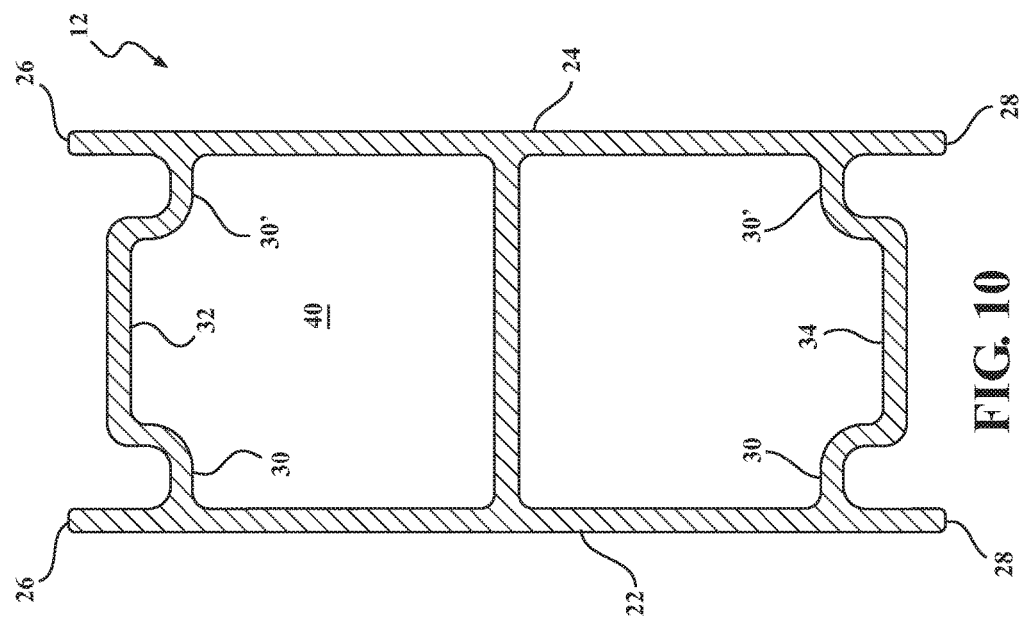
FIG. 9 is a cross-sectional view of the bumper beam illustrating a semi-circular cross-sectional shape of the first and second pair of geometrical features.

The shape of the geometrical features 30, 30', and thus their corresponding geometrical hollows 38, can also be comprised of a variety of cross-sectional shapes. For example, as best illustrated in FIGS. 1-6, each of the geometrical features 30, 30' can be comprised of a triangular cross-sectional shape. However, each of the geometrical features 30, 30' can also be comprised of other polygonal shapes, such as a square cross-sectional shape as illustrated in FIG. 7, or a cubit, diamond, pentagon, hexagon, rectangle, and the like. Additionally, as best illustrated by FIGS. 8 and 9, each of the geometrical features 30, 30' are not limited to polygonal shapes, but can also be comprised of a circular cross-sectional shape (FIG. 8) or a semi-circular cross-sectional shape (FIG. 9). Thus, the dimensions and shapes of the geometrical features 30, 30' of the bumper beam 12 can be varied or tuned to change the energy absorption properties of the bumper beam 12 and provide flexibility for the application of the bumper beam 12 from one vehicle segment to another vehicle segment. Put another way, the bumper beam 12 is tunable simply by choosing a different shape for each pair of geometrical features 30, 30' disposed along the outer portion 22, the inner portion 24, or both.

Figure 10:
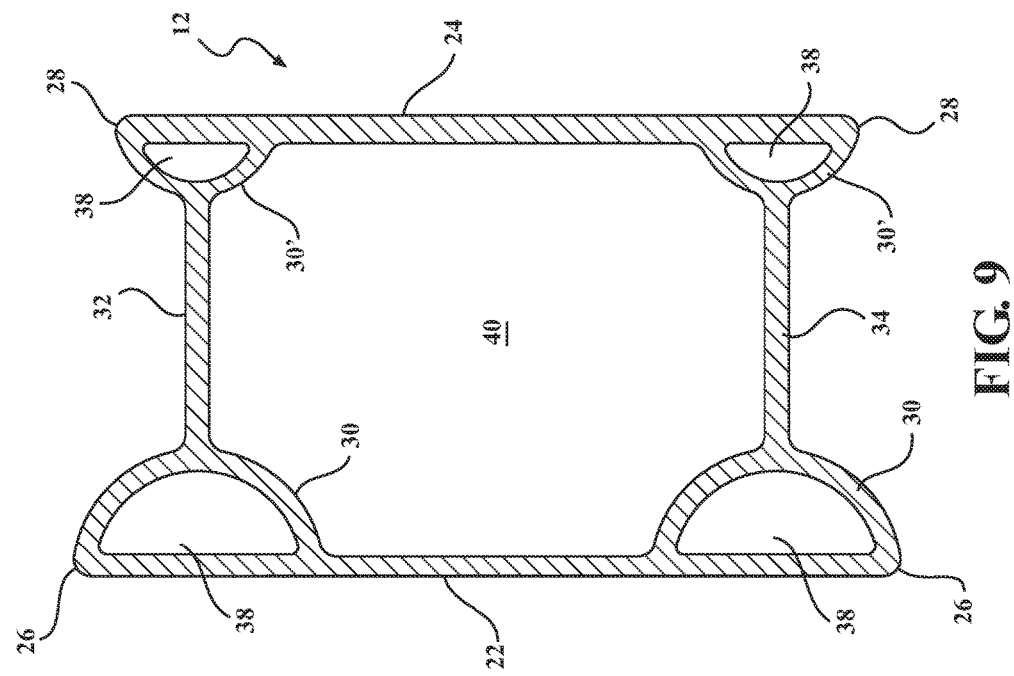
FIG. 10 is a cross-sectional view of the bumper beam illustrating an open cross-sectional shape of the first and second pair of geometrical features.

The size of the geometrical features 30, 30' can also be designed to be bigger or smaller as required by the desired performance characteristics, thus lending further tuning characteristics for the bumper beam 12. For example, as best illustrated by FIGS. 2-4 and 9, each of the first pair of geometrical features 30 disposed on the outer portion 22 of the bumper beam 12 can have a larger cross-sectional shape, and thus define a larger geometrical hollow 38, than the second pair of geometrical features 30' disposed on the inner portion 24 of the bumper beam 12. Additionally, each of the geometrical features in each pair of geometrical features 30, 30' can be sized to have a different shape and size. In other words, the outer portion 22 could include a pair of geometrical features 30 each of which have the same shape or a different shape. Likewise, the inner portion 24 can have a pair of geometrical features 30' that are the same shape as each other or different shapes from each other. Furthermore, although the first and second pairs of geometrical features 30, 30' have been described as a closed structure, each of the first and second pairs of geometrical features 30, 30' can alternatively be designed to be open towards respective top or bottom ends 26, 28 of the bottom beam 12, such as the polygonal, u-shaped geometrical features 30, 30' which are illustrated in FIG. 10.

In a preferred arrangement, the outer portion 22, the inner portion 24, the geometrical features 30, 30', the top wall 32 and the bottom wall 34 are comprised of the same material and collectively defining a bumper hollow 40. In a preferred arrangement, and as best illustrated by FIGS. 1 and 2, the bumper beam 12 has a constant cross-sectional shape extending along its entire length between the first end 18 and the second end 20. However, in other arrangements of the bumper beam 12, the cross-sectional shape of the bumper beam 12 can be different or non-constant between the first and second ends 18, 20 of the bumper beam 12. For example, as best illustrated in FIGS. 11 and 12, the first and second ends 18, 20 of the bumper beam 12 can be crushed to establish a non-constant cross-sectional shape/profile of the bumper beam 12 which is compacted or narrows as it approaches the first and second ends 18, 20. The crushing of the first and second ends 18, 20 creates a projection 42 in the top and bottom walls 32, 34 which extends or projects inwardly into the bumper hollow 40. In an alternative arrangement, the cross-sectional shape can also be changed at the first and second ends 18, 20 of the bumper beam 12 to accommodate attachment of the crush cans 14 to the bumper beam 12.

The length of the top and bottom walls 32, 34 can be varied from one design of the bumper beam 12 to another, if desired and depending on the required performance characteristics. The outer and inner portions 22, 24 also do not need to be of the same height or formed of the same thickness. In addition, as best illustrated in FIGS. 1 and 2, the bumper beam 12 can include a profile that is slightly curved along most of its length and includes a bend adjacent the first and second ends 18 of the bumper beam 12. As best illustrated in FIG. 1, these bends can be used to accommodate the crush can or can simply be incorporated into the design for reasons of bumper fascia shape or for any other performance or vehicle packaging requirement.

The bumper beam 12 can be manufactured from any materials including: aluminum, steel, magnesium, plastic, sheet molded compound (SMC), carbon fiber and other materials. Preferably, the bumper beam 12 is formed from aluminum. The bumper beam 12 can also be manufactured by a variety of processes including: extrusion, stamping, welding together of stamped parts, overmolding, casting, and roll forming. It is desirable that the present bumper beam 12 be formed from strong, yet lightweight materials to reduce overall vehicle weight. A bumper beam 12 made in accordance with the aforementioned disclosure generally permits a reduction in weight in the bumper beam 12 compared to prior art bumper beams for the same vehicle segment. In addition, the tooling used to form a bumper beam 12 according to the aforementioned disclosure can be rapidly redesigned to accommodate required changes based on a new vehicle segment. Unlike the prior art bumper beams, the subject bumper beams 12 have lower tooling requirements and the tooling can be rapidly modified to change the structural and performance characteristics for the bumper beam 12 as required by a given vehicle segment. Thus, the present bumper beam 12 is more adaptable across a wider range of vehicle segments when compared to prior art designs.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

While preferred embodiments of the present invention are shown and described, it is envisioned that those skilled in the art may devise various modifications of the present invention without departing from the spirit and scope of the invention. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of disclosure.

We claim:

1. A bumper beam comprising:
   an outer portion and an inner portion each extending between a top end and a bottom end;
   said outer portion including a first pair of geometrical features each disposed in spaced relationship to one another and adjacent a respective one of said top or bottom ends;
   said inner portion including a second pair of geometrical features each disposed in spaced relationship to one another and adjacent a respective one of said top or bottom ends; and
   a top wall and a bottom wall each extending between one of said first pair of geometrical features and one of said second pair of geometrical features to interconnect said outer and inner portions of the bumper beam.

2. A bumper beam as recited in claim 1, wherein each of said first and second pairs of geometrical features define a geometrical hollow.

3. A bumper beam as recited in claim 1, wherein each of said first and second pairs of geometrical features having a polygonal cross-sectional shape.

4. A bumper beam as recited in claim 3, wherein said polygonal cross-sectional shape comprises a triangular cross-sectional shape.

5. A bumper beam as recited in claim 2, wherein said geometrical hollow is filled with a solid material.

6. A bumper beam as recited in claim 1, wherein each of said first and second pair of geometrical features extending continuously from a first end to a second end of the bumper beam.

7. A bumper beam as set recited in claim 1, wherein said inner portion includes a pair of flanges each extending outwardly from one of said second pair of geometrical features.

8. A bumper beam as recited in claim 1, wherein said first pair of geometrical features having a cross-sectional shape being larger than said second pair of geometrical features.

9. A bumper beam as recited in claim 1, wherein said first pair of geometrical features and said second pair of geometrical features are disposed in opposing and aligned relationship to one another and extend outwardly along said outer and inner portions between a first and second end of the bumper beam.

* * * * *